United States Patent
Neufeld et al.

[11] 3,907,226
[45] Sept. 23, 1975

[54] REDUNDANT POSITION AND ATTITUDE CONTROL FOR SPIN STABILIZED DEVICES

[75] Inventors: Murray J. Neufeld, Studio City; Walter M. Smotrys, Torrance, both of Calif.

[73] Assignee: Hughes Aircraft Company, Los Angeles, Calif.

[22] Filed: June 11, 1973

[21] Appl. No.: 369,021

Related U.S. Application Data

[63] Continuation of Ser. No. 52,149, July 6, 1970, abandoned.

[52] U.S. Cl.............................. 244/169; 244/77 SS
[51] Int. Cl............................................B64g 1/00
[58] Field of Search ............. 244/1 SA, 77 SS, 3.21, 244/3.22, 169

[56] References Cited
UNITED STATES PATENTS

| | | | |
|---|---|---|---|
| 3,233,848 | 2/1966 | Byrne | 244/77 SS X |
| 3,396,920 | 8/1968 | Rosen et al. | 244/3.22 X |
| 3,414,214 | 12/1968 | Robinson et al. | 244/1 SA |
| 3,429,526 | 2/1969 | Genty | 244/1 SA |
| 3,511,452 | 5/1970 | Smith et al. | 244/1 SA |
| 3,582,016 | 6/1971 | Scherman | 244/1 SA |
| 3,636,411 | 1/1972 | Bulloch | 244/77 SS X |
| 3,643,897 | 2/1972 | Johnson | 244/1 SA |

*Primary Examiner*—Trygve M. Blix
*Assistant Examiner*—Barry L. Kelmachter
*Attorney, Agent, or Firm*—William H. MacAllister; Lewis B. Sternfels

[57] ABSTRACT

Position and attitude control for a spin stabilized device is effected by utilizing two pairs of thrust producing jets. The first pair of jets (axial jets) is positioned diametrically opposite each other about the spin axis of the device for providing thrusts parallel to the spin axis. The second pair of jets (canted jets) is positioned diametrically opposite each other about the spin axis and secured at or near a corner of the device for providing thrusts passing through the center of gravity of the device. Continuous firing of one axial jet can be chosen for a time equal to an integer number of spin and nutation periods, such that the residual spin axis precession and nutation will be minimized at the end of the thrusting interval. Continuous firing of two axial jets provides translation of the device. If the instantaneous torque of each jet is unequal, the undesired spin axis precession and nutation angle is reduced to a small fraction ($\leq 0.1$) of the angle that results with firing one axial jet in the continuous mode. A pulsed firing of one axial jet generates spin axis precession where the timing of the firing sector is synchronized to the spin period by using an external spin phase reference. Pulsing of two axial jets is useful as a vernier correction to a precession maneuver, if the very small thrust difference occurs between the two axial jets. This vernier correction can be made concurrently with a translational correction if conservation of energy is desired. Firing of two canted jets, either in the pulsed or continuous modes, provides redundant translational movement of the device. Continuous firing of one canted jet over a number of spin periods provides cancellation of the thrust components normal to the spin axis to also provide redundant translational control function.

46 Claims, 3 Drawing Figures

US Patent  Sept. 23, 1975  3,907,226
Fig. 1.
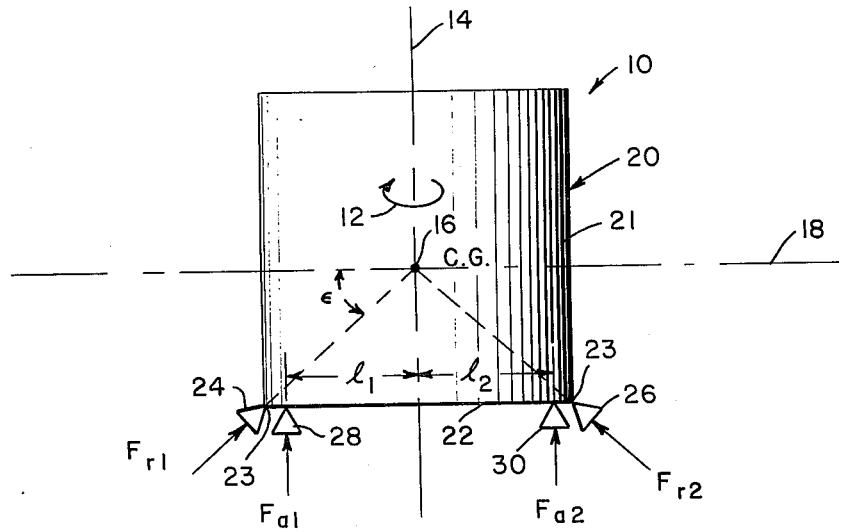
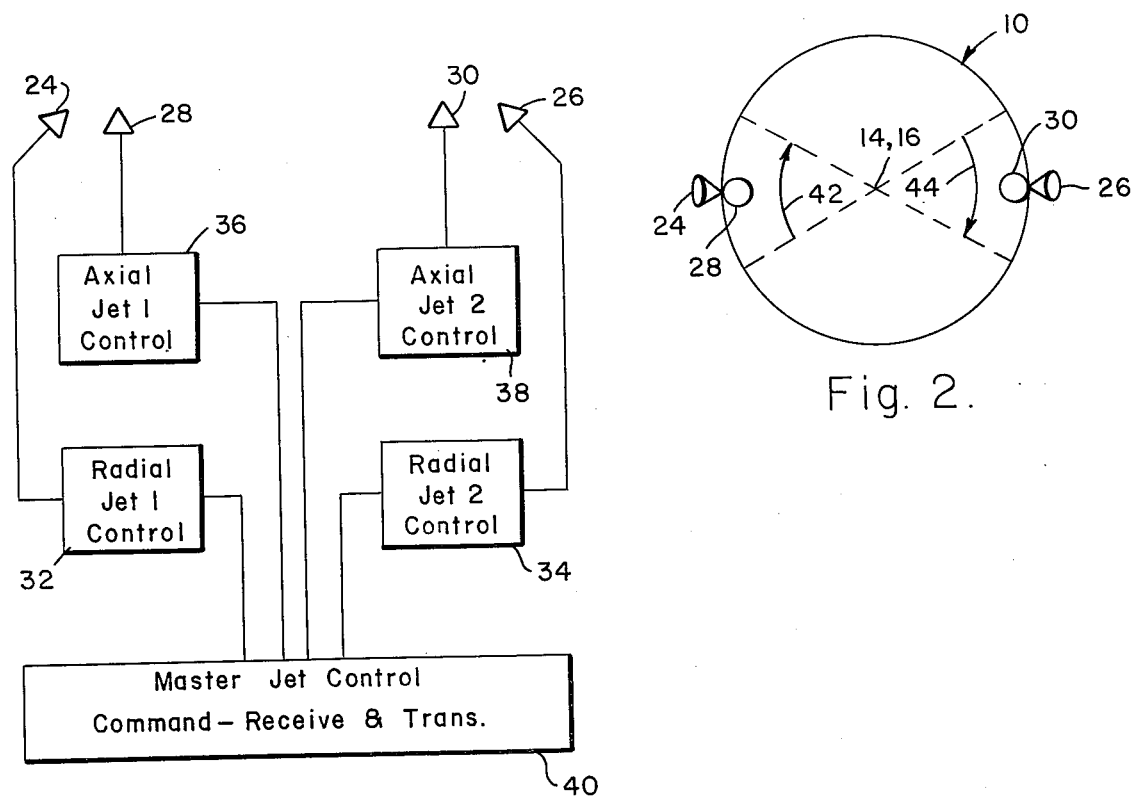
Fig. 2.
Fig. 3.

REDUNDANT POSITION AND ATTITUDE CONTROL FOR SPIN STABILIZED DEVICES

CROSS-REFERENCE TO RELATED APPLICATION

This is a continuation application of copending application, Ser. No. 52,149, filed July 6, 1970, now abandoned.

BACKGROUND OF THE INVENTION

The present invention relates to apparatus and method for controlling the position and attitude of a spin stabilized device.

Spin stabilized devices or vehicles can be utilized in a variety of applications, such as in the laboratory and in the field. As a laboratory instrument, these devices are useful as environmental test beds for duplicating desired modes of environmental operations, such as testing or proving instrumentation performance, spin stability, attitude control and the like. In the field, such as in outer space, such vehicles or devices can be utilized as scientific devices for obtaining and communicating information of physical conditions, etc., and as communication links.

In all these uses, precise positioning of the device with respect to some reference point, such as a testing tool, an observer, and the earth, is many times essential. Two such prior art means for accomplishing a related result is disclosed in U.S. Pat. No. 3,730,457 to Donald D. Williams and in U.S. Pat. No. Re 26,887 to W. B. McLean. This latter patent describes a means of moving a spinning body towards interception with a target in such a manner as to control its target-seeking capabilities and to adjust its velocity. This prior art device is propelled by use of one precessing jet and one lateral jet acting together. The thrust of the precessing jet is directed along an axis which is parallel to the spin axis of the vehicle while the lateral jet provides a thrust which passes through the center of gravity of the vehicle in a plane which is normal to the spin axis. If the McLean vehicle must be accelerated, the precessing jet must be used continuously for one or more complete integers of the vehicle's spin in order to balance out the precessing torques generated. Consequently, the vehicle may be accelerated to too great or too small a degree, thus providing a somewhat imprecise control. Furthermore, it is not possible to obtain any great control over the duty cycle of the precessing jet. In addition, since both the precessing and lateral jets are operated in conjunction, it is possible only to obtain precession or translation along with lateral movement.

SUMMARY OF THE INVENTION

The present invention, on the other hand, relates solely to a means of controlling a spin stabilized device in order for it to maintain as precise an attitude as possible with respect to a reference point. This object is achieved by utilizing a pair of thrust producing means, such as jets, which are placed 180° apart at equal distances from the spin axis of the device. Furthermore, a second pair of thrust producing means are positioned in such a manner as to enable the direction of the thrust to pass through the center of gravity of the device. In addition, the second pair of jets are so located that the direction of their thrusts will not lie within a plane which is normal to the spin axis. Since the second pair of jets are disposed 180° from each other at equal distances from the spin axis, when both jets are actuated, their radial components cancel so as to provide redundant thrust in the direction of the spin axis and will consequently serve as additional translational mode of means to the axial jets. Furthermore, their positions enable maximum use of the exterior surface of the device, which is especially important for space vehicles whose surfaces contain solar cells.

Each of the two pair of jets are operable in conjunction with each other or separately so as to enable any combination of control over the attitude of the device. In addition, no two jets produce exactly the same thrust torque, despite the care exercised in their fabrication. This energy mismatch is utilized in the present invention to obtain vernier corrections to a precession maneuver and, when made concurrently with a translational correction in the direction of the spin axis, energy can be conserved. This latter consideration is of particular importance when the device comprises a satellite whose fuel supply is limited. When such vernier corrections are not needed, the energy mismatch, which will create unwanted nutational movement of the device, can be most easily damped out by use of conventional nutation dampers in a short period of time because such energy mismatch results only in a very small or "$\delta$" torque.

The present invention further provides for close control of the duty cycle of jet actuation. As is well known, when a gyroscopic body is caused to precess, the body also nutates. The nutational characteristics are a function of the spin axis motion and angular momentum of the spinning body. For each gyroscopic body having a particular physical configuration and moment of inertia properties, nutation occurs in a regular manner with maximum and minimum peaks, crossing a zero nutation point also with regularity. Consequently, by controlling the duty cycle of the thrust of an axial jet at the time when nutation is or approaches zero, nutation can be minimized, even if the desired attitude change control of the body has not been completed but only nearly so. At some later period of time when further correction is required, this over or under correction can be then compensated for.

It is, therefore, an object of the present invention to provide attitude control of a spin stabilized body.

Another object is the provision of redundant control of attitude of spin stabilized bodies.

Other aims and objects, as well as a more complete understanding of the present invention, will appear from the following explanation of an exemplary embodiment and the accompanying drawings thereof, in which:

BRIEF DESCRIPTION OF THE DRAWINGS

FIG. 1 is a schematic view of a representative spin stabilized device;

FIG. 2 is an end view of the spin stabilized device of FIG. 1; and

FIG. 3 is a schematic representation of the control means for controlling the two pairs of thrust producing members of the device of FIGS. 1 and 2.

DESCRIPTION OF THE PREFERRED EMBODIMENT

Accordingly, a spin stabilized body 10, exemplified as a spacecraft or a laboratory instrument, is caused to rotate at an angular velocity in the direction of arrow 12 about a spin axis 14. The body is assumed to have a center of gravity at point 16 and also assumed to be positioned with respect to the intersection of the spin axis and a line 18, such as is in the equatorial plane or some other reference. The spin axis and reference line 18 intersect at right angles. Device 10 is provided with an outer surface 20 having a cylindrical peripheral surface 21 and at least one end surface 22 which passes through spin axis 14.

On end surface 22 at or near the external point or points 23 thereof are a pair of thrust producing members 24 and 26, such as jets, having radial vector components which are designed to produce thrusts whose vectors $\overline{F_{r1}}$ and $\overline{F_{r2}}$ are directed toward the center of gravity and which are angled at an angle $\epsilon$ from a plane passing at right angles to the spin axis. A pair of thrust producing members 28 and 30 are also secured to end surface 22 and are disposed to produce thrusts whose vectors $\overline{F_{a1}}$ and $\overline{F_{a2}}$ are directed parallel to spin axis 14.

Each of the jets or thrust producing members is of conventional design and comprises, for example, a nozzle with an electrically controlled valve. Each valve is connected to a source of propulsion fluid, such as nitrogen, hydrogen peroxide, and hydrazine. One exemplary system, utilizing a further propellant, is disclosed in U.S. Pat. Nos. 3,517,508 and 3,520,137.

Although thrust producing means 24 and 26 have both radial and axial thrust components, they will hereinafter be sometimes referred to as "canted" or "radial" jets, along with their controlling equipment, as a convenience to distinguish them from the axial jets and their controlling equipment.

Internal to device 10 is a plurality of jet control means. Radial or canted jet 1 control 32 controls thrust producing means 24, radial or canted jet 2 control 34 controls the operation of thrust producing means 26, axial jet 1 control 36 controls the actuation of the thrust producing means 28, and axial jet 2 control 38 controls the actuation of thrust producing means 30.

Each control 32, 34, 36 and 38 is of conventional design comprising, for example, a solenoid which is operatively coupled to the valve associated with each thrust producing member and a solenoid driver coupled to the solenoid, such as shown in above-noted U.S. Pat. Nos. 3,517,508 and 3,520,137. All four controls, 32, 34, 36 and 38 are controlled by a master jet control receiver and transmitter 40 for individual or combined operation thereof.

Receiver and transmitter 40 is also of wellknown construction and includes sensors for obtaining position and attitude information of the spin stabilized device with respect to a reference point, conventional telemetry equipment with encoders and decoders for receiving and transmitting signals, and ground station equipment for processing and commanding signals to and from the device. Such satellite and earth-based equipment, as stated above, is known. W. R. Corliss in "Scientific Satellites", published 1967 by National Aeronautics and Space Administration, publication NASA SP-133, discloses an overall information-flow diagram in FIG. 5-1 (page 134) in Chapter 5 entitled "Satellite Communication and Data Handling", and a block diagram of an exemplary attitude-control subsystem in FIG. 9-60 (page 353) in Chapter 9 entitled "Design of Scientific Satellites". A more detailed diagram of such a control is shown in "Space Communications", A. V. Balakaishnan, editor, McGraw-Hill Book Company, Inc., 1963, in FIG. 17.4 on pages 342–343 in Chapter 17 entitled "Synchronous Communication Satellite". Such a control system is useful in conjunction with the device disclosed and described in U.S. Pat. No. 3,396,920. Commands furnished by control 40 thereby provides a means for complete control of the velocity, position, and attitude of spin stabilized device 10 as commands are forwarded through the various interconnection and coupling means.

Operation of the axial thrust producing means 28 and 30 may be made continuously or pulsing for either or both of the means. These means 28 and 30 are displaced from the spin axis by a radial distance $l$. The axial means may be operated in a continuous or pulsing firing mode for a single or dual thrust operation over a number of spin periods, the pulsed firing mode occurring, for example, over a given sector 42 or 44 of each spin cycle. The continuous firing mode provides translational control in the direction of spin axis 14 while the pulsed firing mode provides precession control of the device.

For a continuous firing mode of one axial thrust producing means, the actuation time can be chosen to be or not to be an integer multiple of both the spin and nutation periods. However, by choosing the actuation time to be equal to an integer number, N, of spin periods such that $N = K/(\sigma-1)$, wherein $K$ is an integer and $\sigma$ is the ratio of spin-to-transverse moments of inertia, the residual spin axis precession and nutation will be minimized at the end of the thrusting interval. Such operation provides a control over the duty cycle of one axial thrust producing means. For example, it is known from prior operation of device 10 that nutation will occur in a particular manner such that there are maximum and minimum nutations. It is also known that nutation will be zero at certain times. The thrust of one jet is therefore timed to cross the zero axis according to the above equation.

For continuous firing mode of two axial thrust producing means, since the means are separated by 180°, this mode cancels the instantaneous torque $\overline{T} = \overline{l} \times \overline{F_{ai}}$ (where $\overline{F_{ai}} = \overline{F_{a1}}$ or $\overline{F_{a2}}$) of each jet if the thrust magnitudes of the two axial means are equal. If, however as usually occurs, that the two individual thrusts are of slightly different magnitudes even if the actuation time for both thrust producing means are arbitrarily chosen, or if their distances, or moment arms, or deviation from parallel, i.e., direction, from the spin axis are not exactly equal, the instantaneous torque causing the undesired spin axis precession and nutation is reduced to a very small magnitude of a $\delta$ quantity. This may be expressed as follows:

$$|\delta \overline{T}| = |\overline{l} \times \delta \overline{F_a}| << |\overline{T}|, l \approx l_1 \approx l_2$$

where $$|\delta \overline{F_a}| = |\overline{F_{a1}} - \overline{F_{a2}}|$$

is the magnitude of thrust mismatch between the two axial producing means. The average value of the instantaneous torque $\delta \overline{T}$ of the two axial thrust producing means and $\overline{T}$ of one of the axial means is zero after each spin period. For this mode, if one jet is continuously thrust for an integer number N of complete spin cycles, $N = [K/(\delta-1)]$, precession and nutation occur which theoretically balance out at the end of N spin cycles. The foregoing discussion relates to such problems of pointing deviations which occur during the thrusting which, in the case of beam pointing, causes degradation of the beam signal. With two axial jets 180° apart on either side of the spin axis, if the thrusts are equal no instantaneous torque occurs unless there is a slight δ mismatch. For even this very small mismatch, nutation damper means would take a much less time than if only a single jet were used.

In a pulsed firing mode with a single axial thrust propulsion means, spin axis precession will be generated when the timing of the firing sector 42 or 44 is synchronized to the spin period by using an external spin phase reference, such as a light pulse or a sun sensor pulse.

The pulsed firing mode for a dual axial thrust may be used as a vernier correction to a precession maneuver. This mode is useful when the thrust difference $\delta \overline{F_a}$ is calibrated from previous maneuvers. The vernier attitude correction can be made concurrently with a translation correction which is of particular importance when the device comprises a satellite in order to conserve fuel.

In operation of the radial or canted thrust producing means, a continuous operation of a single jet provides translation in the direction of the spin axis only because the radial components laterally to device 10 cancel in the direction of line 18. A pulsed mode operation of a single jet provides translation in the direction of the spin axis as well as a velocity increment in the transverse plane direction containing line 18. When one or both radial or canted jets are operated in the continuous modes over a number of spin periods, the thrust components normal to the spin axis cancel to zero and only the translational or axial components of thrust are effective. Therefore, the canted radial thrust producing means provides a redundant translational control function, albeit with reduced efficiency.

Although the invention has been described with reference to a particular embodiment thereof, it should be realized that various changes and modifications may be made therein without departing from the spirit and scope of the invention.

What is claimed is:

1. In a spin stabilized device having a center of gravity, a spin axis passing through the center of gravity, and an external surface defining the outer limits of the device and providing at least one end surface passing through the spin axis at a point displaced from the center of gravity, an arrangement for control of the position and attitude of the device with respect to a fixed reference point comprising:
   a first pair of thrust producing means positioned diametrically opposite to each other about the spin axis and secured to the end surface in a manner such as to provide thrusts whose vectors are directed parallel to the spin axis when said first pair of thrust producing means are actuated; and
   a second pair of thrust producing means positioned diametrically opposite to each other about the spin axis and secured to the end surface in such a manner as to provide thrusts whose vectors are directed to pass through the center of gravity when said second pair of thrust producing means are actuated, the direction of the thrusts of said second pair passing at an angle ε through any plane normal to the spin axis, the angle ε being 0°<ε<90°.

2. An arrangement as in claim 1 wherein said external surface includes a cylindrical peripheral surface having an axis coinciding with the spin axis, wherein said end surface connects with said cylindrical peripheral surface to define at least two joining points having a relatively maximum distance from the center of gravity, and wherein said second pair of thrust producing means are positioned respectively at the two joining points.

3. An arrangement as in claim 1 further including controllers for each of said pairs of thrust producing means and coupled thereto for controlling said thrust producing means singly and in combination.

4. An arrangement as in claim 3 further including a master controller coupled to each of said controllers, said master controller having means operable to continuously actuate one of said first pair of thrust producing means for a period of time equal to an integer number of device spin periods such that $N = K \div (\delta-1)$, where $N$ is the integer number of spin periods of the device, $K$ is an integer, and $\delta$ is the ratio of spin to transverse moments of inertia of the device, for minimizing the residual spin axis precession and nutation at the end of actuation of said one of said first pair of thrust producing means.

5. An arrangement as in claim 3 further including a master controller coupled to each of said controllers, said master controller having means operable to continuously actuate said first pair of thrust producing means for imparting translation in the direction of the spin axis to the device and to minimize precession of the device when any of the magnitudes, directions, and moment arms of the thrust vectors of each of said first pair of thrust producing means are mismatched.

6. An arrangement as in claim 3 further including a master controller coupled to each of said controllers, said master controller having means operable to pulse one of said first pair of thrust producing means for precessing the device.

7. An arrangement as in claim 3 further including a master controller coupled to each of said controllers, said master controller means operable to pulse said first pair of thrust producing means for providing a vernier precession of the device, when any of the magnitudes, directions, and moment arms of the thrust vectors of each of said first pair of thrust producing means are mismatched, and for imparting translation in the direction of the spin axis to the device.

8. An arrangement as in claim 3 further including a master controller coupled to each of said controllers, said master controller having means operable to pulse and to continuously actuate said second pair of thrust producing means for imparting translation of the device in the direction of the spin axis.

9. An arrangement as in claim 3 further including a master controller coupled to each of said controllers, said master controller having means operable to pulse and to continuously actuate one of said second pair of thrust producing means for imparting translation perpendicular to and/or in the direction of the spin axis and of the device.

10. A method for controlling the position and attitude of a spin stabilized device having a center of gravity, a spin axis passing through the center of gravity, and an external surface defining the outer limits of the device and providing an end surface passing through the spin axis, comprising the steps of:
   utilizing a first pair of thrust producing means positioned diametrically opposite to each other about the spin axis and secured to the end surface for providing thrusts whose vectors are directed parallel to the spin axis when the first pair of thrust producing means are actuated; and utilizing a second pair of thrust producing means positioned diametrically opposite to each other about the spin axis and secured to the end surface for providing thrusts whose vectors are directed to pass through the center of gravity when the second pair of thrust producing means are actuated, the direction of the thrusts of said second pair of thrust producing means passing at an angle $\epsilon$ through any plane normal to the spin axis, the angle $\epsilon$ being $0°<\epsilon<90°$.

11. A method as in claim 10 further including the step of continuously actuating one of the first pair of thrust producing means for a period of time equal to an integer number of device spin periods such that $N = K \div (\delta-1)$, where $N$ is the integer number of spin periods of the device, $K$ is an integer, and $\delta$ is the ratio of spin to transverse moments of inertia of the device, for minimizing the residual spin axis precession and nutation at the end of actuation of said one of said first pair of thrust producing means.

12. A method as in claim 10 further including the step of continuously actuating the first pair of thrust producing means for imparting translation in the direction of the spin axis to the device and to minimize precession of the device when any of the magnitudes, directions, and moment arms of the thrust vectors of each of the first pair of thrust producing means are mismatched.

13. A method as in claim 10 further including the step of pulsing one of the first pair of thrust producing means for precessing the device.

14. A method as in claim 10 further including the step of pulsing the first pair of thrust producing means for providing a vernier precession of the device, when any of the magnitudes, directions, and moment arms of the thrust vectors of each of the first pair of thrust producing means are mismatched, and for imparting translation in the direction of the spin axis to the device.

15. A method as in claim 10 further including the step of pulsing and continuously actuating the second pair of thrust producing means for imparting translation of the device in the direction of the spin axis.

16. A method as in claim 10 further including the step of pulsing and continuously actuating one of the second pair of thrust producing means for imparting translation perpendicular to and/or in the direction of the spin axis and of the device.

17. In a spin stabilized device having a center of gravity and a spin axis passing substantially through the center of gravity, an arrangement for control of the position and attitude of the device with respect to a reference point comprising:

a pair of thrust producing means positioned substantially diametrically opposite to each other about the spin axis for producing thrusts; and structural means for securing said pair of thrust producing means to the spin stabilized device at at least two joining points on a first plane distanced from and substantially parallel to a second plane normal to the spin axis and passing through the center of gravity, for directing the thrust vectors of the thrusts substantially through the center of gravity when said pair of thrust producing means are actuated at an angle $\epsilon$ to the second plane, the angle $\epsilon$ being $0°<\epsilon<90°$, and for providing the thrusts with axial and radial components.

18. An arrangement as in claim 17 further including controllers for said pair of thrust producing means and coupled thereto for controlling said thrust producing means singly and in combination.

19. An arrangement as in claim 18 further including a master controller coupled to each of said controllers, said master controller having means operable to pulse and to continuously actuate said pair of thrust producing means for imparting translation of the device in the direction of the spin axis.

20. An arrangement as in claim 18 further including a master controller coupled to each of said controllers, said master controller having means operable to pulse and to continuously actuate one of said pair of thrust producing means for imparting translation perpendicular to and in the direction of the spin axis of the device.

21. An arrangement as in claim 18 further including a master controller coupled to each of said controllers, said master controller having means operable to pulse and to continuously actuate one of said pair of thrust producing means for imparting translation perpendicular to the spin axis of the device.

22. An arrangement as in claim 18 further including a master controller coupled to each of said controllers, said master controller having means operable to pulse and to continuously actuate one of said pair of thrust producing means for imparting translation in the direction of the spin axis of the device.

23. A method for controlling the position and attitude of a spin stabilized device having a center of gravity, a spin axis passing substantially through the center of gravity, and a plane normal to the spin axis and passing through the center of gravity, comprising the steps of:

positioning a pair of thrust producing means substantially diametrically opposite to each other about the spin axis of the spin stabilized device; and thrusting and directing the thrust producing means for providing thrusts with axial and radial components whose resultant vector directions thereof pass substantially through the center of gravity when the pair of thrust producing means are actuated and at an angle $\epsilon$ to the plane normal to the spin axis and passing through the center of gravity, the angle $\epsilon$ being $0°<\epsilon<90°$.

24. A method as in claim 23 further including the step of pulsing and continuously actuating the pair of thrust producing means for imparting translation of the device in the direction of the spin axis.

25. A method as in claim 23 further including the step of pulsing and continuously actuating one of the pair of thrust producing means for imparting translation perpendicular to and in the direction of the spin axis of the device.

26. A method as in claim 23 further including the step of pulsing and continuously actuating one of the pair of thrust producing means for imparting translation perpendicular to the spin axis of the device.

27. A method as in claim 23 further including the step of pulsing and continuously actuating one of the pair of thrust producing means for imparting translation in the direction of the spin axis of the device.

28. In a spin stabilized device having a center of gravity and a spin axis passing substantially through the center of gravity, an arrangement for control of the position and attitude of the device with respect to a reference point comprising:
- a pair of thrust producing means positioned substantially diametrically opposite to each other about the spin axis and secured to the spin stabilized device for providing thrusts whose vectors are directed substantially parallel to the spin axis when said thrust producing means are actuated and thereby for inducing residual spin axis precession and nutation when the actuation is ended;
- controllers for said pair of thrust producing means and coupled thereto for controlling said thrust producing means singly and in combination; and
- a master controller coupled to each of said controllers, said master controller having means for continuously actuating one of said pair of thrust producing means for a period of time equal to an integer number of device spin periods such that $N = K \div (\delta-1)$, where $N$ is the integer number of spin periods of the device, $K$ is an integer, and $\delta$ is the ratio of spin to transverse moments of inertia of the device, said master controller means thereby operable for minimizing the residual spin axis precession and nutation at the end of actuation of said one of said pair of thrust producing means.

29. In a spin stabilized device having a center of gravity and a spin axis passing substantially through the center of gravity, an arrangement for control of the position and attitude of the device comprising:
- a pair of thrust producing means positioned substantially diametrically opposite to each other about the spin axis and secured to the spin stabilized device for providing and directing thrusts whose vectors are directed substantially parallel to the spin axis when said pair of thrust producing means are actuated, and for providing a mismatch of at least one of the magnitudes, directions and moment arms of the thrust vectors; and
- control means coupled to said thrust producing means for continuously actuating said pair of thrust producing means for an integer number of complete spin cycles, for imparting translation to the device in the direction of its spin axis and for minimizing any precession and nutation of the device resulting from the mismatch of any of magnitudes, directions, and moment arms of the thrust vectors of each of said pair of thrust producing means.

30. In a spin stabilized device having a center of gravity and a spin axis passing substantially through the center of gravity, an arrangement for effecting corrections in the position and attitude of the device comprising:
- a pair of thrust producing means positioned substantially diametrically opposite to each other about the spin axis and secured to the spin stabilized device for providing thrusts whose vectors are directed parallel to the spin axis when said pair of thrust producing means are actuated, and for providing a mismatch of at least one of the magnitudes, directions and moment arms of the thrust vectors; and
- control means for said thrust producing means and coupled thereto for controlling said thrust producing means, and having means for pulsing said pair of thrust producing means, for imparting a vernier precession force on the device by using to advantage the resultant mismatch of any of the magnitudes, directions, and moment arms of the thrust vectors of said pair of thrust producing means, and for imparting translation in the direction of the spin axis to the device.

31. A method for controlling the position and attitude of a spin stabilized device having a center of gravity, and a spin axis passing substantially through the center of gravity, comprising the steps of:
- positioning a pair of thrust producing means substantially diametrically opposite to each other about the spin axis and securing the pair of thrust producing means to the spin stabilized device for providing thrusts whose vectors thereof are directed substantially parallel to the spin axis when the pair of thrust producing means are thrusted;
- thrusting one of the pair of thrust producing means and thereby inducing residual spin axis precession and nutation when the thrusting is terminated;
- continuing the thrusting for a period of time equal to an integer number of device spin periods in accordance with the relationship $N = K \div (\delta-1)$, where $N$ is the integer number of spin periods of the device, $K$ is an integer, and $\delta$ is the ratio of spin to transverse moments of inertia of the device; and
- terminating the thrusting at the end of the period of time for minimizing the residual spin axis precession and nutation at the end of the thrusting of the one of the pair of thrust producing means.

32. A method for controlling the position and attitude of a spin stabilized device having a center of gravity, and a spin axis passing substantially through the center of gravity, comprising the steps of:
- securing a pair of thrust producing means to the spin stabilized device at positions substantially diametrically opposite to each other about the spin axis for providing thrusts whose vectors thereof are directed substantially parallel to the spin axis when the pair of thrust producing means are thrusted, and providing a mismatch of at least one of the magnitudes, directions and moment arms of the thrust vectors;
- thrusting the pair of thrust producing means for imparting translation in the direction of the spin axis to the device;
- continuing the thrusting for an integer number of complete spin cycles and thereby minimizing precession of the device, resulting from the mismatch of any of the magnitudes, directions, and moment arms of the thrust vectors of each of the pair of thrust producing means; and
- terminating the thrusting at the end of the integer number of complete spin cycles.

33. A method for effecting corrections to the position and attitude of a spin stabilized device having a center of gravity, and a spin axis passing substantially through the center of gravity, comprising the steps of:
- securing a pair of thrust producing means to the spin stabilized device at positions substantially diametrically opposite to each other about the spin axis for providing thrusts whose vectors are directed substantially parallel to the spin axis when the pair of thrust producing means are thrusted, and providing a mismatch of at least one of the magnitudes, directions and moment arms of the thrust vectors; and
- pulse thrusting the pair of thrust producing means and using to advantage the resultant mismatch of any of the magnitudes, directions, and moment arms of the thrust vectors of the pair of thrust producing means as a vernier precession correction force on the device, and imparting translation of the device in the direction of the spin axis to the device.

34. In a spin stabilized device having a center of gravity and a spin axis passing substantially through the center of gravity, apparatus for control of the position and attitude of the device comprising:
at least one thrust producing means for producing a thrust and means for securing said thrust producing means to the spin stabilized device at an angle $\epsilon$ to the plane normal to the spin axis for directing the thrust whose vector direction passes substantially through the center of gravity at the angle $\epsilon$ the angle $\epsilon$ being $0°<\epsilon<90°$, and thereby for providing the thrust with axial and radial components; and
means coupled to said thrust producing means for actuating said thrust producing means.

35. An apparatus as in claim 34 further including a master controller coupled to said controller means, said master controller having means operable to pulse and to continuously actuate said thrust producing means for imparting translation of the device in the direction of the spin axis.

36. An apparatus as in claim 34 further including a master controller coupled to said controller means, said master controller having means operable to pulse and to continuously actuate said thrust producing means for imparting translation perpendicular to and in the direction of the spin axis of the device.

37. Apparatus as in claim 34 further including a master controller coupled to said actuating means, said master controller having means operable to pulse and to continuously actuate said thrust producing means for imparting translation perpendicular to the spin axis of the device.

38. Apparatus as in claim 34 further including a master controller coupled to said actuating means, said master controller having means operable to pulse and to continuously actuate said thrust producing means for imparting translation in the direction of the spin axis of the device.

39. A method for controlling the position and attitude of a spin stabilized device having a center of gravity, a spin axis passing substantially through the center of gravity, and a plane normal to the spin axis and passing through the center of gravity, comprising the steps of:
securing at least one thrust producing means to the spin stabilized device at an angle $\epsilon$ to the plane normal to the spin axis;
thrusting the thrust producing means for providing at least one thrust; and
directing the thrust vector of the thrust substantially through the center of gravity at the angle $\epsilon$, the angle $\epsilon$ being $0°<\epsilon<90°$, and thereby providing the thrust vector with axial and radial components.

40. A method as in claim 39 further including the step of pulsing and continuously actuating the thrust producing means for imparting translation of the device in the direction of the spin axis.

41. A method as in claim 39 further including the step of pulsing and continuously actuating the thrust producing means for imparting translation perpendicular to and in the direction of the spin axis of the device.

42. A method as in claim 39 further including the step of pulsing and continuously thrusting the thrust producing means for imparting translation perpendicular to the spin axis of the device.

43. A method as in claim 39 further including the step of pulsing and continuously thrusting the thrust producing means for imparting translation in the direction of the spin axis of the device.

44. In a spin stabilized device having a center of gravity and a spin axis passing substantially through the center of gravity, an arrangement for control of the position and attitude of the device comprising:
at least one thrust producing means secured to the spin stabilized device for providing a thrust whose vector is directed substantially parallel to the spin axis when said thrust producing means is actuated and for inducing thereby residual spin axis precession and nutation when the actuation is ended; and
controller means for said thrust producing means and coupled thereto for controlling said thrust producing means, and for continuously actuating said thrust producing means for a period of time equal to an integer number of device spin periods such that $N = K \div (\delta-1)$, where $N$ is the integer number of spin periods of the device, $K$ is an integer, and $\delta$ is the ratio of spin to transverse moments of inertia of the device, said controller means thereby operable for minimizing the residual spin axis precession and nutation at the end of actuation of said thrust producing means.

45. A method for controlling the position and attitude of a spin stabilized device having a center of gravity, and a spin axis passing substantially through the center of gravity, comprising the steps of:
securing thrust producing means to the spin stabilized device for producing a thrust whose vector thereof is directed substantially parallel to the spin axis when the thrust producing means is thrusted;
thrusting the thrust producing means and thereby inducing residual spin axis precession and nutation when the thrusting is terminated;
continuing the thrusting for a period of time equal to an integer number of device spin periods such that $N = K \div (\delta-1)$, where $N$ is the integer number of spin periods of the device, $K$ is an integer, and $\delta$ is the ratio of spin to transverse moments of inertia of the device; and
terminating the thrusting at the end of the period of time for minimizing the residual spin axis precession and nutation at the end of the thrusting of the thrust producing means.

46. In a spin stabilized device having a center of gravity and a spin axis passing substantially through the center of gravity, an arrangement for control of the position and attitude of the device with respect to a reference point comprising:
a pair of thrust producing means positioned substantially diametrically opposite to each other about the spin axis and secured to the spin stabilized device in such a manner as to provide thrusts whose vectors are directed to pass substantially through the center of gravity when said pair of thrust producing means are actuated, the direction of the thrusts of said pair passing at an angle $\epsilon$ through any plane normal to the spin axis, the angle $\epsilon$ being $0°<\epsilon<90°$; and
structural means defining at least two joining pointe having a relatively maximum distance from the center of gravity, said pair of thrust producing means positioned respectively at the two joining points.

* * * * *